June 17, 1952     R. J. GOLLONG     2,600,638
WASH PLUG
Filed May 12, 1948
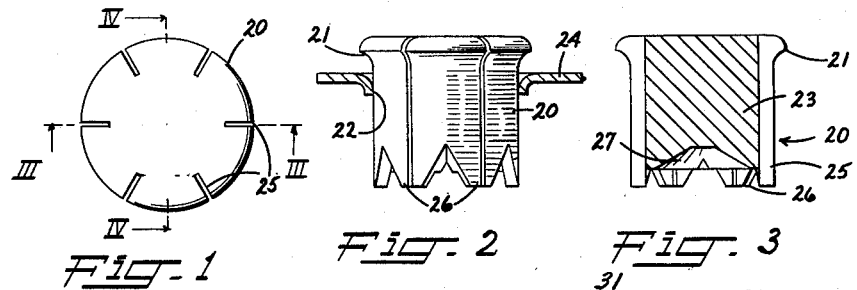
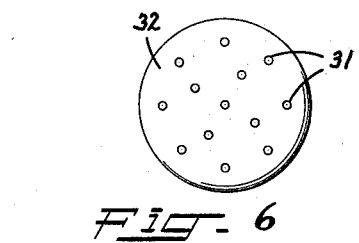
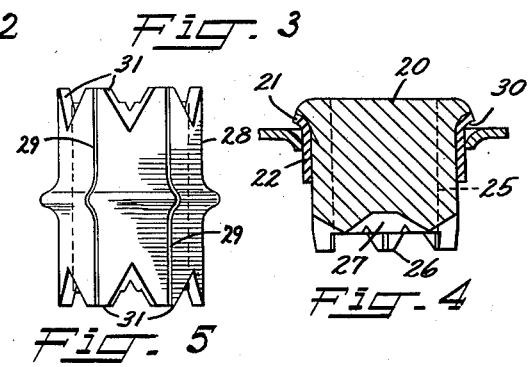
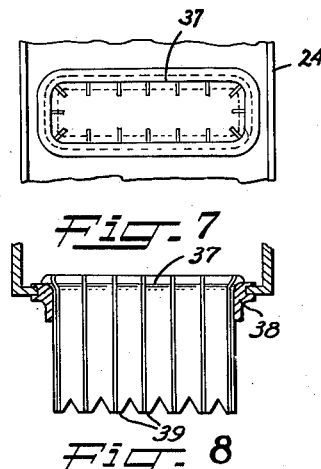
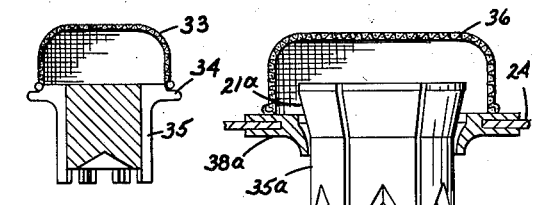
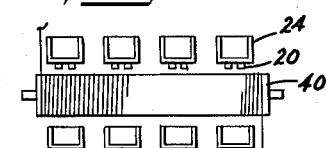
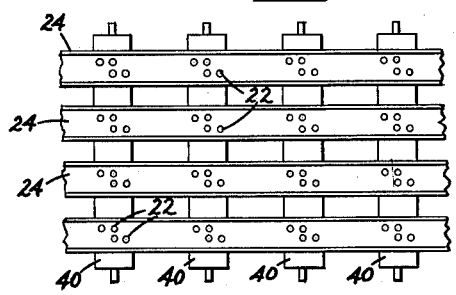
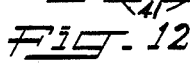
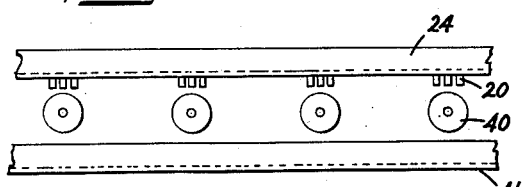
INVENTOR,
RICHARD J. GOLLONG
BY
Thomas R. O'Malley Patented June 17, 1952

2,600,638

UNITED STATES PATENT OFFICE 2,600,638

WASH PLUG

Richard Julius Gollong, Wilmington, Del., assignor to American Viscose Corporation, Wilmington, Del., a corporation of Delaware Application May 12, 1948, Serial No. 26,501

9 Claims. (Cl. 299—58)

This invention relates to apparatus for fine stream distribution of liquids, particularly to such agencies as may be employed to uniformly distribute liquids on continuously moving materials in the wet processing of sheet, woven, or strand materials.

It is highly advantageous at times to apply water of liquids in a multiplicity of small streams to such materials as may continuously be carried along on a conveyor or over a roll, as in the continuous processing of artificial strand materials, such as viscose rayon by the wet continuous process. Application of the liquid reagents must be accurate and carefully directed, particularly when the treatment of materials is effected by fine streams dropped or otherwise directed upon the strands, in order to efficiently utilize said reagents and to obtain strands of uniform quality. Heretofore, devices such as perforated pipes and attachable weir troughs or boxes have been employed in obtaining the fine stream division desired in continuous strand treatment. Perforated pipes have as principal disadvantages clogging, lack of flexibility in stream regulation, variation of stream size resulting from pressure gradient occurring along a length of such pipe, inconvenience in time consumed in replacing or repairing such a pipe during continuous operation, and difficulty in maintaining all the orifices in uniform free-flowing condition. On the other hand, weir troughs are necessarily of expensive construction since they require accurately spaced and shaped weirs and liquid-conducting grooves. Considerable corrosion-resistant material goes into their construction and they must be formed by expensive molding processes. Moreover, in the modern rayon spinning plant, thousands of such troughs or boxes are required to deliver liquid to the large number of spinning units customarily operated. In order that stream uniformity be obtained from all of the weirs on a single box, each box must be mounted in perfect horizontal alignment. Hitherto these boxes have been fixed to a supporting structure and are not readily replaceable without considerable expenditure of time and labor.

As principal objects of the invention, apparatus is provided for fine stream liquid distribution upon running surfaces whereby uniformity in spacing and flow of separate streams is obtained; also apparatus is provided which is extremely simple and lends itself to interchangeability, standardization and replaceability; furthermore, it must be quite inexpensive and capable of being replaced instantaneously so as not to interrupt the strand treatment process and thus result in the occurrence of excessive lengths of untreated strand within the final strand package. Another object is to provide liquid distributing apparatus which is relatively insensitive to liquid level changes of magnitude up to an inch in a supply tank, trough or reservoir and the levelness of elements of the apparatus itself. Another object of the invention is to provide a means for accurately metering water or other treating fluids used for processing continuously moving material. It is an object also to provide a fluid distribution apparatus suitable for serving many machines of similar structure in spaced arrangement such as found in the modern artificial-filament producing factory. Still another object is to provide apparatus of which regulatory devices controlling the flow of liquids are accessible for instant replacement. Other objects, features and advantages of the invention will be apparent from the following description of the invention and the drawings.

In the drawings illustrative of the invention,

Fig. 1 is a top view of a preferred embodiment;

Fig. 2 is a side view of the device shown in Fig. 1;

Fig. 3 is a diametric section of the device of Fig. 1 along line III—III;

Fig. 4 is another diametric section of the device of Fig. 1 taken along line IV—IV;

Fig. 5 is a side view of a modified form of the device shown in Fig. 1;

Fig. 6 is a top view of another modification of the invention;

Fig. 7 is still another modification of the device shown in Fig. 1;

Fig. 8 is a side sectional view of apparatus shown in Fig. 7;

Figs. 9 and 10 illustrate the use of screens relative to the invention;

Figs. 11, 12 and 13 are diagramatic top, end, and side views, respectively, of strand processing machinery illustrating the use of the invention;

Broadly, the invention comprises a conduit such as a trough or tank extending over one or more conveyors or thread-storing, thread-advancing devices, such as thread-advancing reels, or canted rolls the bottom of the conduit being suitably apertured to receive slotted or apertured plugs fashioned according to the invention. For use with thread-advancing devices, the trough or tank may extend lengthwise or transversely to the axis of one or more of such devices. Thread advancement along such rolls is in a direction generally parallel to their axes. The plugs are slotted in such a manner that the slots extend vertically along the sides of the plug or they may be longitudinally apertured as by holes obtained by drilling the plug. The slots or apertures are accurately cut to provide any predetermined cross-sectional area and may be spaced along the sides or interior of the plug to give any predetermined distribution upon the thread conveyor of a liquid supplied to the trough. The pattern of openings, if more than one is involved, along the trough bottom may be in any arrangement necessary to provide proper and adequate stream distribution for the strand-carrying devices to which the conduit is intended to supply liquid.

Figure 1 is a top view of a fluid distributing plug according to the invention. Plug 20 as seen in Figure 2 has an annular flange portion, the lower side 21 of which serves as a supporting surface when the plug is placed within an aperture such as apertures 22 extending through the bottoms of troughs 24 as seen in Figures 11 to 13, inclusive. Plug 20 is round when viewed from the top and has a general cylindrical body 23. Slots 25 extend along the side of the plug parallel with its axis at circumferential intervals. An important factor controlling the design of the plug 20 is that the arrangement of the slots 25 is such that liquid streams issuing therefrom do not merge. It is found that the slots 25 should not be closer than about ½" for water or liquids of similar physical properties. However, in order to obtain this spacing of the slots, the lower extremities thereof terminate in extensions 26 of the outside walls of the plug. These extensions may be wedge-shaped as shown in Figs. 3 and 4 or square-cornered, as shown in Fig. 9, so long as they are of sufficient length to overcome the capillarity of the water which tends to conduct water to points between adjacent slots and subsequently fill up the intervening space with liquid. Once the intervening space is filled with water, a common stream is established for two or more slots. Similarly, the central portion of the lower end of a plug must be recessed to avoid diametrical bridging or merging of the liquid.

Figs. 3 and 4 illustrate a conical recess 27 as embodied in the plug 20, the sides of which preferably should not have an angle greater than 45° with the axis of the plug. Figs. 3 and 4 illustrate different diametrical cross-sections of the plug 20 in order to show the depth and shape of the slots 25.

Since apertures are not easily formed through the wall of the conduit which fit the shoulder 21 of the plug 20 to the degree needed to prevent leakage between the plug and the periphery of the aperture 22, a thin resilient sleeve or bushing 30 may be provided around the plug 20 covering the surface of shoulder 21 as shown in Fig. 4. A slightly larger aperture 22 may be provided to give additional clearance for insertion of a plug having a bushing therearound.

Fig. 5 illustrates another plug 28 which may be inserted into an aperture, such as aperture 22, by its bottom or top portion. Slots 29 may be of the same cross-section or size on either the top or bottom portion so that if slots of one portion become clogged the plug may be readily removed and its opposite end inserted into the aperture. The slots 29 terminate in extensions 31 of either body portion of the plug. The construction of this plug 28 may be similar in all respects to the construction of plug 20 except for its duplicating portion.

As another modification of the plugs already shown, Fig. 6 illustrates a plug 32 wherein round holes 31 extend through the body portion of the plug and conduct the liquid from the trough bottom in lieu of the slots 25 of the plug 20. However, the fluid entrances to the holes are more subject to clogging but are also easier to clean than the entrances to the slots and if desired, a filtering means may be provided to properly filter a liquid before passing through a plug. Screens may be placed over each plug such as screen 33, as shown in Fig. 9, which rests upon a flange portion 34 of the plug 35; or screen 36, as shown in Fig. 10, which rests upon the upper flat surface of a grommet 38a about the plug 35a. In the absence of a grommet the screen may rest upon the surface of the trough about the plug. Such screens may be used advantageously in connection with any of the plugs herein described. Fig. 10 illustrates a plug 35a having a relatively long gently-tapered shoulder portion 21a. The tapered surface tends to wedge tightly within the grommet 38a, forming thereby, a structure which is highly resistant to leaking.

Fig. 7 illustrates a non-circular plug 37 which may be of sufficient length to extend substantially across the trough 24 and to serve in place of several circular plugs such as the plugs 20. Obviously the amount and distribution of treating liquid may be regulated by having several interchangeable plugs of standard size such as the plug 37 but with different slot spacing and slot size.

A side view of the plug 37 is shown in Fig. 8 wherein it is shown inserted into a grommet 38 and having body extensions 39 in which the liquid conducting slots 39a terminate. In non-circular or large plugs, such as plug 37, it may be more difficult to obtain non-leakable seating of the plug along the conduit surface surrounding an aperture. For this reason, therefore, a resilient grommet 38 of elastic material moulded to a shape which fits tightly in a stretched condition about the sides of plug 37, is placed in the trough bottom to provide a yielding leak-proof seat such as described for the circularly-shaped plugs. The inner peripheries of such grommets may be considered as defining the openings of the conduits into which the plugs are inserted. Such grommets may be of a vulcanized rubber composition or of any elastic-plastic material suitable for resisting the swelling action of such liquids as may be handled.

Figs. 11 to 13, inclusive, show top and side views of a continuous strand treating arrangement wherein the strand to be treated is introduced onto one end of a reel 40 and subjected to several different treating operations before being withdrawn from the opposite end of the reel. In typical plant conditions, several hundred or more of such reels might be placed in parallel arrangement and identical operations carried out on all reels. Under such conditions, a long trough 24 may be extended across many of such reels with apertures in the bottom immediately over each reel over which the trough extends. Several of such troughs may be placed side by side as shown in Figs. 11, 12 and 13 in a parallel arrangement for handling the different liquids necessary for accomplishing separate treatments carried out simultaneously on a single reel 40, but duplicated on all the reels 40. The present invention provides an extremely simple and inexpensive arrangement for supplying liquids for such a system of reels as shown in Figure 11. Such liquid distribution is applicable to any running thread-advancing or storing devices or rotors such for example an interdigitating reel or a two-rotor system wherein running strand is advanced along canted rolls through successive convolutions about the rotors.

The fluid distributing plugs or inserts herein described are not necessarily restricted to vertical gravity-directed streams such as produced when the inserts extend through the bottom wall of a conduit, although they are most satisfactorily employed in this manner. Such plugs or inserts may be used to project liquid at any angle and liquid may be forced through them at any desired liquid head or pressure. As used in rayon processes, they normally project through the bottom of an open top conduit and are subjected to a practically negligible pressure of liquid maintained at a height of an inch or so. The liquid after passing through the inserts drops into thread-advancing reels. The liquid flows downward over the rolls along the advancing thread and is recovered as it drops off the rolls 40 into means such as the catch basins 41. Since the liquid-carrying slots in the plugs extend upwards through the supporting flange or shoulder, an appreciable section of the slots are exposed to the liquid-carrying region of the trough or conduit. Any particles which tend to clog the slots are retained first across the base of the portion of the slots exposed to the conduit interior, flush with the peripheral surface of the plug or the shoulder thereof, leaving an appreciable entrance to the slot above the clogged portion through which liquid may enter. On account of this construction, inserts such as plug 20 do not clog readily and their condition as to sediment collection may be easily observed before the streams issuing from the plugs are visibly affected.

As indicated hereinbefore, the minimum size of such plugs is governed by the minimum spacing and the number of the orifices, slots, or apertures desired through the plug. It is preferable in most liquid treating processes to space the apertures not less than one half of an inch apart. For example, the minimum diameter for a six-slot plug of generally cylindrical shape is approximately one inch.

In the practice of the invention very satisfactory six-slot plugs were used having a body portion diameter of 1.12 inches and a diameter through the supporting flange of 1.37 inches. The slots extended longitudinally the entire length of the plug and ranged from 0.03 to 0.07 of an inch across on various plugs and ⅛ of an inch deep. As shown in the drawing, the plugs of the various embodiments are of unitary construction comprising a single material. The plugs were made preferably from ceramic material, although serviceable plugs for handling acid solutions used in viscose rayon making were made from molded Bakelite. The material for making the plugs, however, will be indicated by the corrosion problem attendant upon the handling of any specific type liquid to which the plugs are to be exposed. Other materials available are aluminum, stainless steel, porcelainized metal, and resin-coated metal.

Plugs or inserts according to the invention have a decided advantage over devices heretofore used, in that the plugs constitute the principal means of stream control and may be exposed and open to visual inspection at all times. Plugs may be changed instantaneously by workmen wearing rubber gloves, a very important feature, since if the stream adjusting operation is slow, many yards of untreated filament may pass during an adjustment or exchange of stream regulating apparatus on a modern artificial filament spinning machine. Moreover, the rate of flow through the plugs is not greatly effected by variations of an inch or so in the supply conduit or trough. By using simple troughs equipped with plugs according to the invention, the complex arrangements of piping, valving and expensive equipment attendant upon the use of weir boxes or perforated pipes is eliminated. Moreover, the invention reduces the skill and care necessary for the operation of fine stream producing equipment.

While preferred embodiments have been shown, it is understood that changes and variations may be made without departing from the spirit and scope of the invention as defined in the appended claims.

I claim:

1. In combination, a liquid distributing insert of unitary construction and a liquid conduit wall having an opening therethrough, said insert comprising a body portion having a peripheral surface adapting it to be inserted through and to fit within the opening and having an end-surface disposed exteriorly of the conduit when the insert is positioned in the opening, a shoulder portion extending outwardly from the peripheral surface for engaging the inner surface of the conduit adjacent the opening to support the insert therewithin, extensions of the body portion projecting from said end-surface in a direction away from the conduit with adjacent extensions being spaced peripherally along the outer margin of the end-surface at least one half inch apart measured from center to center, a straight passageway extending lengthwise of the insert along its outer surface from the outer end of each extension centrally thereof into communication with the interior of the conduit.

2. A liquid distributing insert as defined in claim 1 wherein the side surfaces of the body extensions extend from the body portion in a direction parallel to the lengthwise direction of the passageways.

3. A liquid distributing insert as defined in claim 1 wherein the extensions are truncated and the side surfaces thereof are inclined with respect to the lengthwise direction of the passageways.

4. A liquid distributing insert and a conduit in accordance with claim 1, the conduit having a round opening and the peripheral surface of the insert adjacent the shoulder portion being circular and complementary in contour with said opening.

5. A liquid distributing insert as defined in claim 1, the insert being unitary in construction and comprising a single material, and the passageways being peripherally spaced narrow slots extending inwardly from the peripheral surface and the surface of the shoulder portion.

6. A liquid distributing insert as defined in claim 1 for an elastic grommet-lined opening, said insert having a gently tapered shoulder for engagement with the grommet.

7. A liquid distributing insert as defined in claim 1 wherein the insert has upper and lower slotted body portions with the shoulder portion extending outwardly from the juncture of the body portions, said body portions being substantially similar in cross sectional contour and being insertable within the same conduit wall opening.

8. A combination as defined in claim 1 comprising a pre-shaped screen of such a mesh that the interstices are smaller than the insert passageways for placing over the portion of the insert projecting into the conduit.

9. A combination as defined in claim 8 wherein the screen has a rim adapted to fit about the portion of the insert projecting inwardly of the conduit.

RICHARD JULIUS GOLLONG.

REFERENCES CITED

The following references are of record in the file of this patent:

UNITED STATES PATENTS

| Number | Name | Date |
|---|---|---|
| 916,984 | Bleymehl | Apr. 6, 1909 |
| 965,116 | Morison | July 19, 1910 |
| 977,389 | Heldt | Nov. 29, 1910 |
| 1,032,657 | Briggs | July 16, 1912 |
| 1,561,275 | Page | Nov. 10, 1925 |
| 1,659,926 | Stocker | Feb. 21, 1928 |
| 1,896,204 | Schacht | Feb. 7, 1933 |
| 1,940,923 | Stringer | Dec. 26, 1933 |
| 2,054,087 | Knebusch et al. | Sept. 15, 1936 |
| 2,204,802 | Gessler | June 18, 1940 |
| 2,205,366 | Stoeckly | June 18, 1940 |
| 2,211,106 | Elliott | Aug. 13, 1940 |
| 2,287,031 | Frohwein | June 23, 1942 |
| 2,343,804 | Salemme | Mar. 7, 1944 |

FOREIGN PATENTS

| Number | Country | Date |
|---|---|---|
| 1,219 | Great Britain | 1872 |